(12) United States Patent
Srivastava et al.

(10) Patent No.: US 12,309,609 B2
(45) Date of Patent: May 20, 2025

(54) CONFIGURATION MANAGEMENT AND IMPLEMENTATION OF WIRELESS NETWORKS

(71) Applicant: Charter Communications Operating, LLC, St. Louis, MO (US)

(72) Inventors: Praveen C. Srivastava, Ashburn, VA (US); Vikas Sarawat, Broomfield, CO (US); Bernard R. Kingsley, Jr., Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 425 days.

(21) Appl. No.: 17/689,250

(22) Filed: Mar. 8, 2022

(65) Prior Publication Data
US 2023/0292139 A1 Sep. 14, 2023

(51) Int. Cl.
*H04W 16/18* (2009.01)
*H04W 16/02* (2009.01)
*H04W 72/27* (2023.01)
*H04W 72/56* (2023.01)

(52) U.S. Cl.
CPC ........... *H04W 16/18* (2013.01); *H04W 16/02* (2013.01); *H04W 72/27* (2023.01); *H04W 72/56* (2023.01)

(58) Field of Classification Search
CPC ..... H04W 16/18; H04W 72/27; H04W 72/56; H04W 16/02
See application file for complete search history.

(56) References Cited

U.S. PATENT DOCUMENTS

| 8,929,931 | B1 | 1/2015 | Goldberg et al. | |
|---|---|---|---|---|
| 9,008,670 | B2 | 4/2015 | Goldberg et al. | |
| 2014/0051451 | A1* | 2/2014 | Goldberg | H04W 16/24 455/446 |
| 2015/0341502 | A1* | 11/2015 | Udeshi | H04W 16/18 455/446 |
| 2018/0121576 | A1* | 5/2018 | Mosher | G06N 20/00 |
| 2018/0211441 | A1* | 7/2018 | Priest | B64U 10/14 |

* cited by examiner

*Primary Examiner* — Mohammad S Anwar
(74) *Attorney, Agent, or Firm* — Armis IP Law, LLC

(57) ABSTRACT

A configuration management resource receives wireless coverage information indicating a desired wireless coverage to be provided by a new wireless network in a selected geographical region. The configuration management resource retrieves network infrastructure map information and corresponding at least one image to produce the proposed wireless network installation plan. The network infrastructure map information indicates locations of available physical infrastructure to support installation of wireless access points. In addition to analyzing the network infrastructure map information, the configuration management resource also analyzes supplemental image information (such as including one or more images) of the available physical infrastructure to determine corresponding supplemental attributes of the available physical infrastructure. The configuration management resource produces a proposed wireless network installation plan for a new wireless network based on the locations and the corresponding attributes determine from analyzing the image information.

35 Claims, 10 Drawing Sheets

CONFIGURATION MANAGEMENT AND IMPLEMENTATION OF WIRELESS NETWORKS

BACKGROUND

Conventional RF (Radio Frequency) technology has been used for many years to connect wireless devices such as phones, laptops, etc., to a landline network and other wireless networks. Today, such networks support many different types of connection services such as voice communications, cell communications, high-speed data services, Wi-Fi™ connectivity, and so on.

Cellular networks typically include a land area that has been divided into so-called cellular regions. A single base station typically resides in each cell. Often, the base station is connected to a landline network and supports communication with one or more wireless subscribers operating in a region covered by the cell. Accordingly, a wireless subscriber operating a cell phone in the cell is able to communicate with or have access to a landline network via a wireless link between the subscriber and a base station.

Conventional long-range cellular networks sometimes do not have the ability to provide connectivity to users at every location in a geographical region. One reason for this shortcoming is the high cost associated with designing and subsequently implementing a long-range cell tower for every portion of a geographical region. In many instances, a cell tower providing long-range coverage requires a long-term financial commitment. In certain instances, because costs are so high, a service provider may not even install a cell tower because it is not a good investment.

More recent wireless technology includes so-called pico base stations or Wi-Fi™ stations having the ability to provide short-range coverage compared to long-range coverage provided by conventional cell towers. The short-range base stations have the ability to provide coverage in locations that were not previously possible. As an example, a pico base station may provide radial coverage on the order of 200-300 meters. A long-range base station or conventional cell tower may provide wireless coverage on the order of a mile or more.

Because of cost concerns and higher re-usage of frequencies in the RF spectrum, it is now becoming more common to implement one or more pico base stations to provide additional wireless coverage in a region. Small cell base station deployment may increase the number of cells in a given area, and thereby, improve the overall network capacity without adding more RF spectrums. In certain cases, a short-range base station can be mounted to existing infrastructure (e.g., a cable), alleviating the costs associated with having to design and erect a dedicated tower.

BRIEF DESCRIPTION OF EMBODIMENTS

Embodiments herein provide improved implementation of wireless access networks and expand use of limited wireless bandwidth in a network environment.

More specifically, a configuration management resource receives wireless coverage information indicating a desired wireless coverage to be provided by a new wireless network in a selected geographical region. The configuration management resource retrieves network infrastructure map information and corresponding at least one image to produce the proposed wireless network installation plan. The network infrastructure map information indicates locations of available physical infrastructure to support installation of wireless access points. In addition to analyzing the network infrastructure map information, the configuration management resource also analyzes supplemental image information (such as including images) of the available physical infrastructure to determine corresponding height attributes of the available physical infrastructure. In one embodiment, the at least one image are generated by one or more camera devices that receive and capture optical signals reflected off the different instances of the physical infrastructure in a respective geographical region. The configuration management resource produces a proposed wireless network installation plan for a new wireless network based on the locations and the corresponding height information.

In further example embodiments, analyzing at least one image of the available physical infrastructure includes mapping locations of the available physical infrastructure as indicated by the network infrastructure map information to respective instances of the available physical infrastructure in the image information. The physical infrastructure in the image information is then analyzed for possibly supporting one or more wireless access points and corresponding implementation of the new wireless network.

Further example embodiments herein include installing the one or more wireless access points in a network environment to deploy the wireless network and provide the desired wireless coverage in the geographical region.

In yet further example embodiments, the operation of analyzing image information of the available physical infrastructure includes: detecting presence of a wireless signal interfering object in a vicinity of first available physical infrastructure; and detecting presence of no wireless signal interfering object in a vicinity of a second available physical infrastructure. In response to detecting presence of no wireless signal interfering object in the vicinity of the second available physical infrastructure, the configuration management resource or other suitable entity selects the second available physical infrastructure for installation of a respective wireless access point associated with the proposed wireless network installation plan.

Still further example embodiments herein include, via the communication management resource, selecting an instance of the physical infrastructure in which to install a wireless access point associated with the proposed wireless network installation plan based on detected undesirable objects as indicated by the at least one image.

The image information of the available physical infrastructure can be analyzed in any suitable manner to determine corresponding height attributes of the available physical infrastructure. For example, in one embodiment, the configuration management resource detects presence of a known type of object in the at least one image. The configuration management resource maps the known type of object to corresponding dimension information. Via extrapolation or other suitable image processing techniques, the configuration management resource determines the height attributes of the available physical infrastructure based on the corresponding dimension information.

Based on determined height attributes of the physical infrastructure, the configuration management resource selects first physical infrastructure of the available physical infrastructure in which to install a first wireless access point associated with the proposed new wireless network. The communication management resource then produces the proposed wireless network installation plan to include implementation of the first wireless access point at a first height with respect to the first physical infrastructure. In further example embodiments, prior to installation of the new wireless network as indicated by the proposed wireless network installation plan, the communication management resource or other suitable entity performs a test simulation to confirm that the proposed wireless network installation plan provides a desired wireless coverage in a geographical region.

In further example embodiments, the configuration management resource determines a geographical region in which to install the new wireless network, maps the geographical region to channel information indicating available channels to support the new wireless network, and produces the proposed wireless network installation plan based at least in part on the channel information of available channels in the geographical region in which the new wireless network is being installed.

Note that the proposed wireless network installation plan as discussed herein can include any number of wireless access points (a.k.a., wireless base stations, wireless stations, customer premises equipment, etc.) to provide desired wireless coverage in a particular geographical region. For example, in one embodiment, the proposed wireless network installation plan can be configured to include implementation of at least a first wireless access point at a first location and implemented at a first height determined from the corresponding height attributes. In further example embodiments, the configuration management resource performs a wireless simulation of the proposed wireless network installation plan based on implementation of the first wireless access point at the first location and at the first height.

In further example embodiments, based on the height information attributes and other attributes such as a nearness of wireless signal blocking objects in a vicinity of respective physical infrastructure, the configuration management resource produces a priority listing of different instances of physical infrastructure that are best candidates in which to install wireless access points.

Embodiments herein are useful over conventional techniques. For example, implementation of a configuration management resource and corresponding operations as discussed herein provides improved and expeditious implementation of wireless networks to provide wireless connectivity to different users.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: retrieve network infrastructure map information indicating locations of available physical infrastructure to support installation of wireless access points; analyze image information including at least one image of the available physical infrastructure to determine corresponding supplemental attributes of the available physical infrastructure; and produce a proposed wireless network installation plan for a new wireless network based on the locations and the corresponding supplemental attributes.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
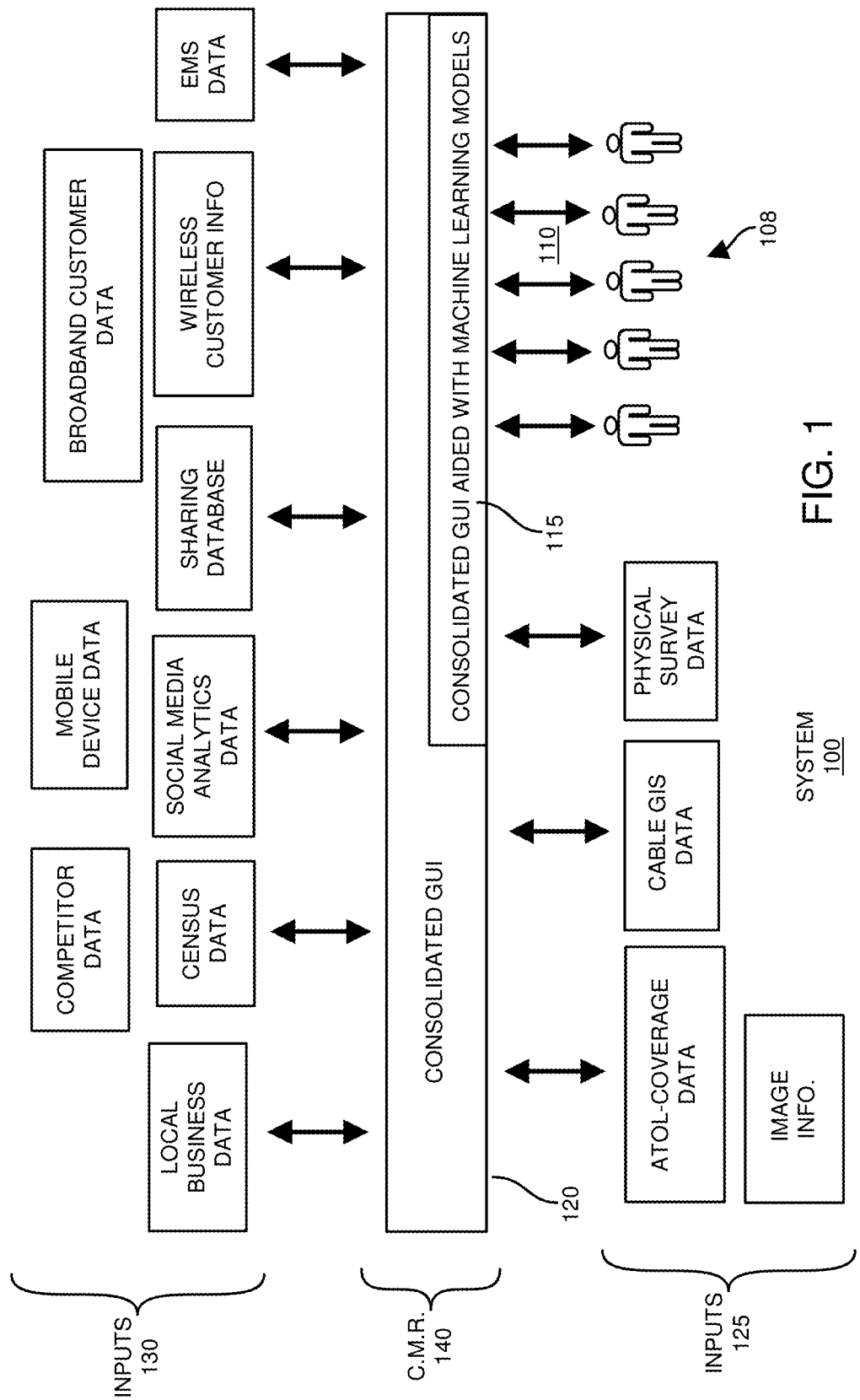
FIG. 1 is an example diagram illustrating implementation of a configuration management resource and related complements according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

RF design, site selection, deployment and optimization are complex exercises involving information from several stakeholders as well as internal and external databases. Prior system required human intervention to retrieve and process information from disjointed systems to complete a wireless design and deployment process.

Embodiments herein include implementing novel and streamlined processes to provide RF network design and deployment.

For example, a configuration management resource (such as hardware or executed software instructions) receives wireless coverage information indicating a desired wireless coverage to be provided by a new wireless network in a selected geographical region. The configuration management resource retrieves network infrastructure map information and corresponding at least one image to produce the proposed wireless network installation plan. The network infrastructure map information indicates locations of available physical infrastructure to support installation of wireless access points. In addition to analyzing the network infrastructure map information, the configuration management hardware also analyzes supplemental image information (such as including one or more images) of the available physical infrastructure to determine corresponding supplemental attributes (such as height, objects, etc.) of or associated the available physical infrastructure. In one embodiment, the one or more images (image information) are generated by one or more camera devices that receive and capture optical signals reflected off the different instances of the physical infrastructure in a respective geographical region. The configuration management hardware produces a proposed wireless network installation plan for a new wireless network based on the locations and the corresponding attributes determine from analyzing the image information.

FIG. 1 is an example diagram illustrating implementation of a configuration management resource according to embodiments herein.

Embodiments herein include system 100 and corresponding configuration management resource 140. The configuration management resource 140 includes the consolidated GUI 120 (Graphical User Interface) and the consolidated GUI aided with machine learning models 115. Consolidated GUI 120 is operative to collect, display, and analyze information from several input 125 and 130 (i.e., input sources) to make wireless network implementation design recommendations and streamline the design, deployment, and optimization of RF networks.

As further shown, input 130 of system 100 and includes local business data, competitor data, census data, mobile device data, social media analytics data, sharing database, broadband customer data, wireless customer information, and EMS data.

In one embodiment, the local business data includes such as information about local business in the vicinity of a planned RF deployment for intentional coverage.

The sharing database includes a collection and overlay of network data (SAS, AFC, etc.,) in the proposed consolidated GUI helps understand the spectrum availability, best location, and antenna direction.

The broadband customer and competitor data include an overlay of competitors and broadband customer data showing the potential for customer acquisition at different locations.

The census data includes collection of census and social media analytics data illustrating whether RF coverage needs to be adjusted to cover the concertation of people in a location.

The mobile device data includes performance data (e.g., from end-user devices to further aid with the network optimization.

The wireless customer information includes knowledge such as counts of nearby MVNO (Mobile Virtual Network Operator) customers, supporting decisions regarding rental of RF sites at different locations.

The EMS data includes GUI information and also displays performance data from the existing deployments to, for example, decide network optimization.

As further shown, input 125 includes ATOL coverage data, cable GIS data, physical survey data, and image information.

Thus, the consolidated GUI 120 can be configured to receive and record input from several stakeholders and recommend next steps based on historical actions in similar past situations of implementing wireless networks.

Embodiments herein further include a consolidated GUI with machine learning models 115 to automatically identify, based on inputs 125, any obstructions (e.g., such as transformers, trees, buildings, etc.) or absence of desirable features (cable) associated with a proposed site. Further, based on the inputs 125, the consolidated graphical user interface with machine learning models 115 can be configured to calculate attribute such as a height above ground in which a respective new wireless access point can be deployed. Additionally, based on the input 125, the consolidated GUI with machine learning models 115 can be configured to determine useful sign information such as space between cables, power availability, location of telco lines on respective physical infrastructure, etc.

Implementation of the system 100 is beneficial over conventional techniques. For example, a product team such as including one or more users 108 operate the consolidated GUI 120 to mark the general location of the desired RF coverage and also track the progress.

In one embodiment, different engineering teams use the system 100 for RF design and to publish possible RF site locations for the field staff. Field staff uploads data from field survey and site acquisition feasibility information. Sales teams use the tool show coverage and performance to the customer. Engineers look at the network performance data from the gNB and UE, spectrum sharing data for optimization.

In further example embodiments, the system 100 stores past actions and any changes in network performance. Based on such information, the system can automatically recommend optimization steps.

Note that the configuration management resource as described herein can be implemented in any suitable manner. For example, the configuration management resource 140 can be implemented as configuration management hardware, configuration management software, or a combination of configuration management hardware and configuration management software.

Figure 2:
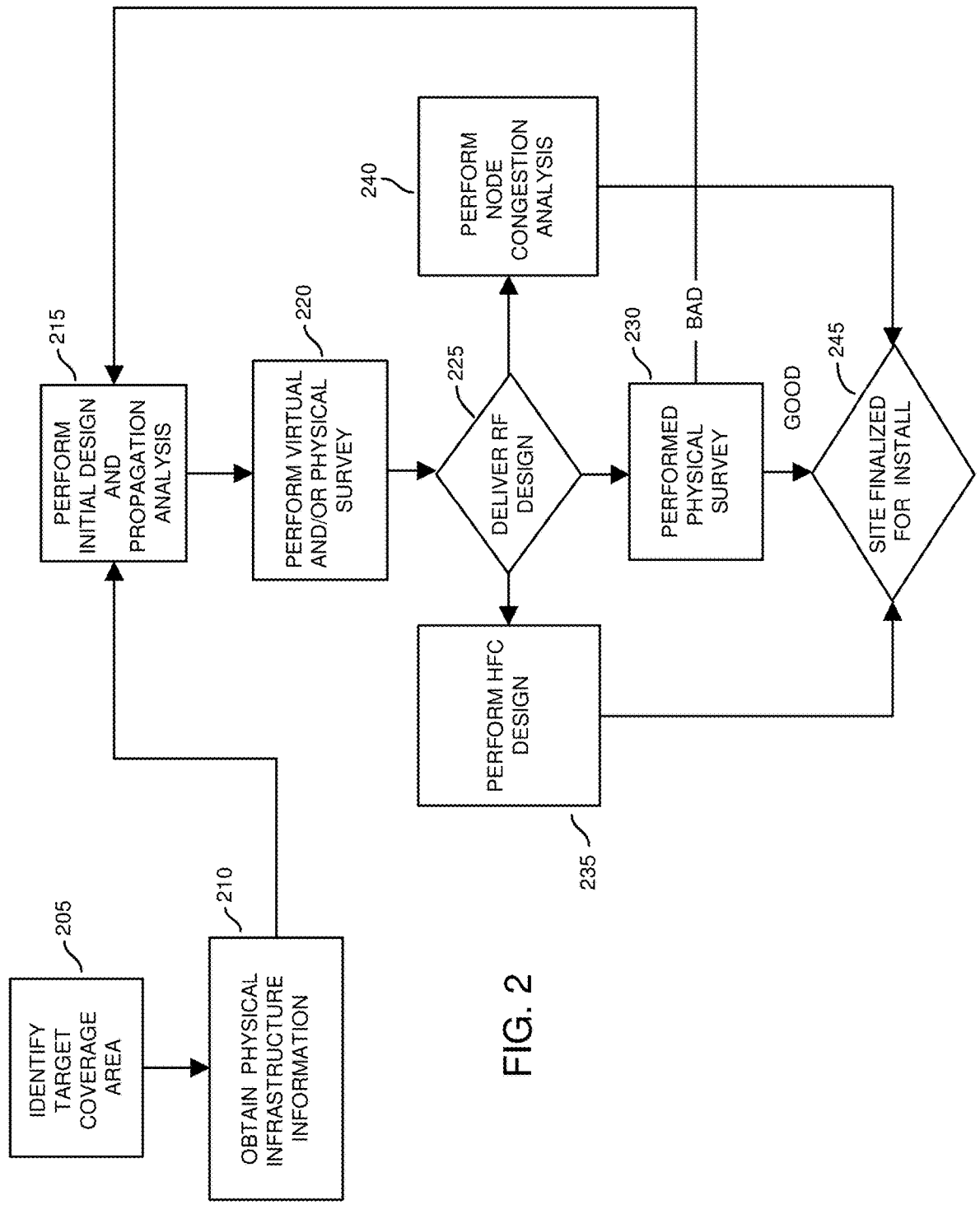
FIG. 2 is an example flow diagram illustrating operations to generate a respective proposed wireless network installation plan according to embodiments herein.

FIG. 2 is an example flow diagram illustrating operations to generate a respective proposed wireless network installation plan according to embodiments herein.

In processing operation 205, the configuration management resource 140 as described herein identifies a target wireless coverage area to be provided by a new (yet to be designed) wireless network or an existing wireless network.

In processing operation 210, the configuration management resource 140 obtains physical infrastructure information associated with any physical infrastructure (such as poles, power, communication cables, etc.) available in the target wireless coverage area.

In processing operation 215, the configuration management resource 140 performs an initial design of the new wireless network (such as including corresponding implementation of one or more instances of wireless base station hardware). In one embodiment, the configuration management resource 140 performs a propagation analysis associated with the new wireless network proposed at a corresponding geographical location.

In processing operation 220, the configuration management resource 140 and/or other suitable entity performs one or more virtual and/or physical in-person surveys associated with providing the wireless services in an identified coverage area.

In processing operation 225, the configuration management resource 140 delivers a proposed wireless network design to one or more entities for further processing.

For example, in processing operation 235, the configuration management resource 140 performs an HFC (Hybrid Fiber Coax) design. In processing operation 240, the configuration management resource 140 performs a node congestion analysis to determine a level of congestion associated with implementation of the proposed wireless network implementation. In processing operation 230, an entity such as a field technician physically or virtually visits the site and performs a survey of whether the proposed wireless network can be implemented at the specified location. If results of the survey indicate that the proposed wireless network cannot be supported at the location, then processing continues at processing operation 215. Conversely, if the results of the survey indicate that the proposed wireless network can be supported at the location, processing continues at processing operation 245.

In processing operation 245, the site of the new wireless network is prepared for installation of the proposed wireless network. As further as discussed herein, installation can include installing one or more wireless access points at selected one or more locations in a vicinity of the geographical region to be provided the new wireless coverage.

Note that implementation of the flowchart 200 and corresponding operations provides benefits one or more over conventional techniques. For example, embodiments herein: i) more efficiently and more quickly provides proposed RF design with near real time design approvals, ii) provides field surveyor live feedback from lead RF design engineer, iii) improves accuracy due to access to plant database, iv) minimizes human error in documenting information, v) facilitates database integrity by maintaining a single master database, vi) reduces dependency on 3rd party vendors, vii) minimizes number of site visits and time per survey, viii) lowers AP redesign rate, ix) automate RF Design data entry process.

Figure 3:
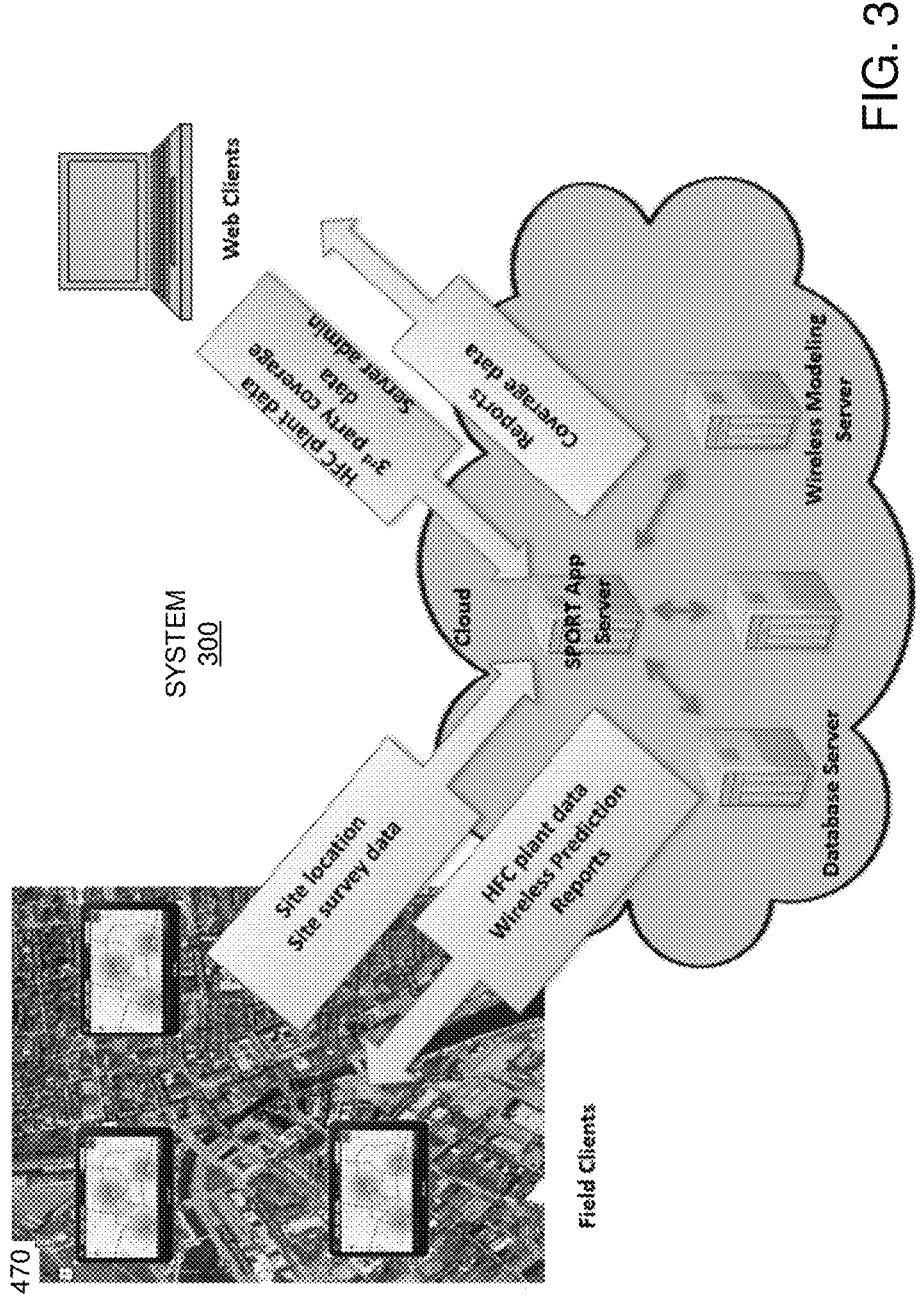
FIG. 3 is an example diagram illustrating a system architecture according to embodiments herein.

FIG. 3 is an example diagram illustrating a system architecture according to embodiments herein.

In this example embodiment, system 300 illustrates multiple resources facilitating implementation of generating and implementing a proposed wireless network installation plan. Additional details associated with generation of a respective wireless network installation plan are shown in FIG. 4.

Figure 4:
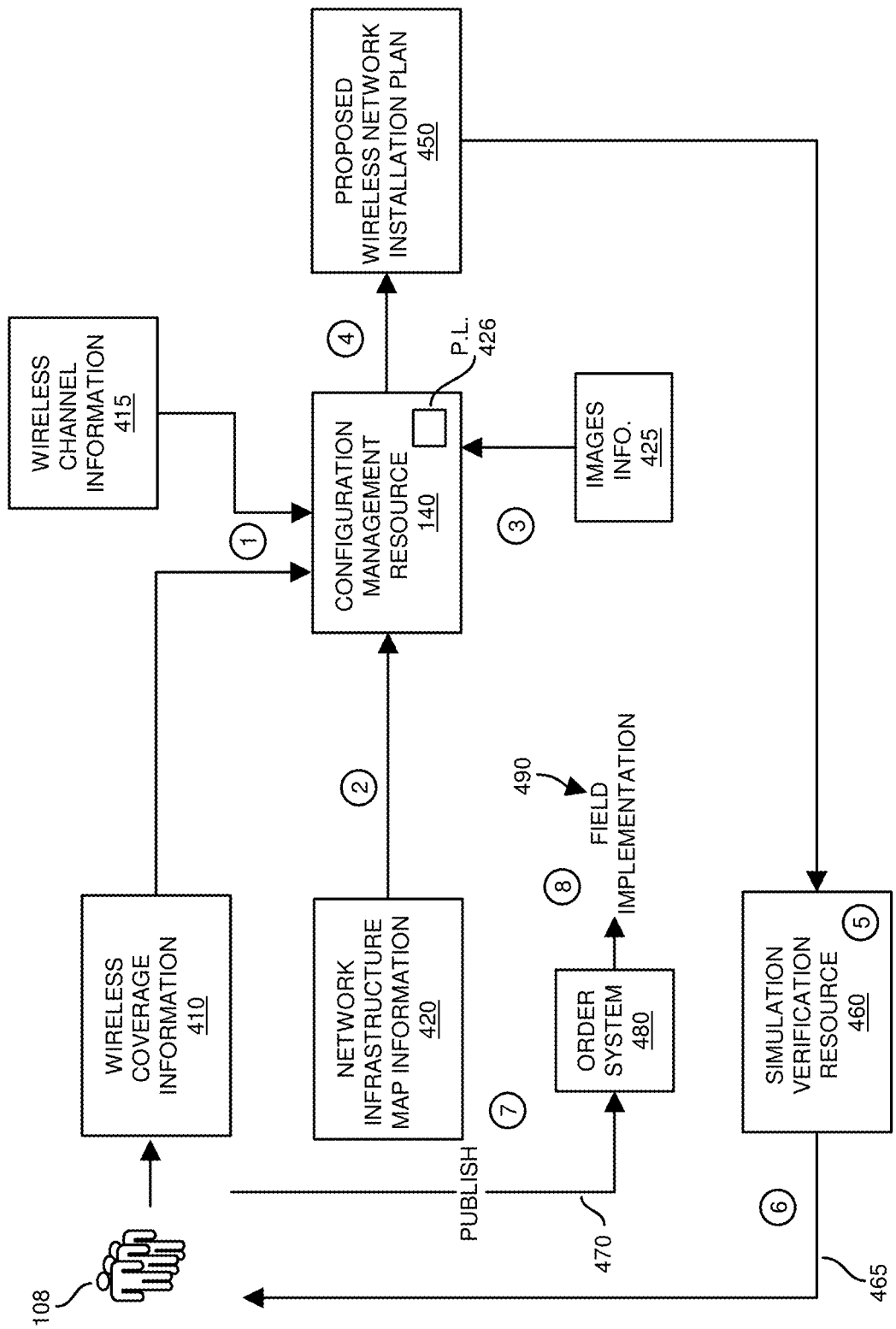
FIG. 4 is an example diagram illustrating operations of generating a respective proposed wireless installation plan according to embodiments herein.

FIG. 4 is an example diagram illustrating operations of generating a respective proposed wireless installation plan according to embodiments herein.

In this example embodiment, in operation #1, the user 108 or other suitable entity supplies wireless coverage information 410 to the configuration management resource 140. In one embodiment, the wireless coverage information 410 specifies the geographical region in which to provide wireless services to one or more communication devices, subscriber domains, etc., in those regions. Thus, the configuration management resource 140 receives wireless coverage information 410 indicating a desired wireless coverage to be provided by a new wireless network in a selected geographical region as specified by the wireless coverage information 410.

In further example embodiments, the configuration management resource 140 determines a geographical region in which to install the new wireless network and maps the specified geographical region to channel information indicating available channels (such as PAL channels in a citizen band radio system or CBRS spectrum) to support the new wireless network and produces the proposed wireless network installation plan 420 based at least in part on the channel information. In certain instances, the service provider implementing the wireless network pays for a license to use a portion of the CBRS channels (such as PAL channels). In other instances, the service provider is only able to use the GAA channels. In other instances, the service provider is able to use both PAL channels and GAA channels. The configuration management resource 140 uses the availability of the different channels for use by the service provider as a basis to determine how to deploy one or more wireless base stations.

In addition to receiving the wireless coverage information 410, the configuration management resource 140 receives/retrieves network infrastructure map information 420 and corresponding image information 425 (such as one or more images) to produce the proposed wireless network installation plan 450. As further discussed herein, the network infrastructure map information 425 indicates locations and respective attributes (such as x-z axis or top view perspective) of available physical infrastructure to support installation of one or more new wireless access points to provide wireless services in the area specified by the wireless coverage information 410.

In further example embodiments, the configuration management resource 140 analyzes supplemental information such as images (such as image information 425) of the available physical infrastructure to determine corresponding attributes (such as height, impediments, surrounding obstacles, etc.) of the available physical infrastructure (such as in the x-y axis or side view perspective).

In one embodiment, the images associated with image information 425 are generated by one or more camera devices that receives optical signals reflected off the different instances of the physical infrastructure in a respective geographical region. Alternatively, the images of image information 425 are drawings of the respective physical infrastructure. As further discussed herein, the configuration management resource 140 produces a proposed wireless network installation plan 450 for a new wireless network based on the locations and the corresponding attribute information.

In further example embodiments, note that analyzing images of the available physical infrastructure includes the configuration management resource 140 or other suitable entity mapping locations of the available physical infrastructure as indicated by the network infrastructure map information to respective instances of the available physical infrastructure in the images.

More specifically, the configuration management resource 140 uses the wireless coverage information 410 to identify physical infrastructure to support the new wireless network. The network infrastructure map information 420 can be configured to indicate corresponding locations of the available physical infrastructure resources. The image information 425 can be configured to include location information as well indicating respective locations of available physical infrastructure. The network infrastructure map information 420 provides first attributes associated with the available physical infrastructure resources. The image information 425 provides supplemental attributes associated with the physical infrastructure resources and includes location information associated with the corresponding physical infrastructure, enabling the configuration management resource 140 to use the image information 425 as a way to determine additional attributes associated with the physical infrastructure as indicated by the network infrastructure map information 420.

Thus, embodiments herein include determining attributes associated with available physical infrastructure and selected geographical region from multiple sources, namely, the network infrastructure information 420, image information 425, wireless channel information 415, etc.

Based on analyzing and the learned attributes of the different available physical infrastructure in the geographical region as specified by the wireless coverage information 410, the configuration management resource 140 produces the proposed wireless network installation plan 450 in operation #4.

In processing operation #5, as its name suggests, the simulation/verification resource 140 or other suitable entity performs a respective simulation/verification of the proposed wireless network installation plan 450 via the simulation verification resource 460. In one embodiment, via the notification 465 in processing operation #6, the simulation verification resource 106 notifies the corresponding users 108 whether simulation of the proposed wireless network installation plan 450 meets a desired performance level.

In operation #7, via command 470, the user 108 or other suitable entity publishes the proposed wireless network installation plan 450 to order system 480. In processing operation #8, the one or more technicians or other suitable entities install the one or more wireless access points in a network environment (as specified by the plan 450) to deploy the new wireless network and provide the desired wireless services in the geographical region as specified by the wireless coverage information 410.

Figure 5:
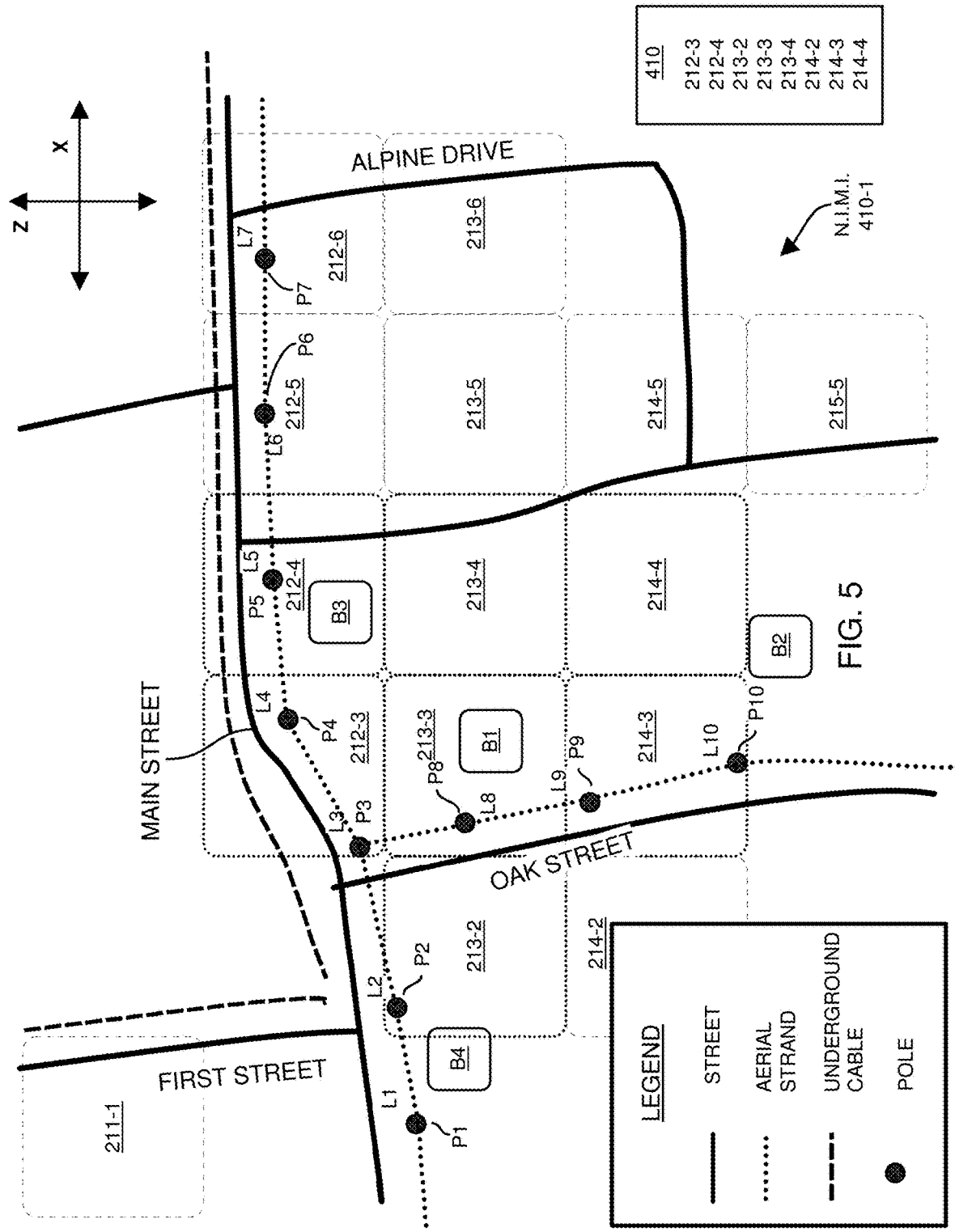
FIG. 5 is an example diagram illustrating network infrastructure mapping information according to embodiments herein.

FIG. 5 is an example diagram illustrating network infrastructure mapping information according to embodiments herein.

In this example embodiment, the network infrastructure map information 410-1 indicates presences of geographical regions in a network environment and corresponding locations of physical infrastructure.

For example, as shown, network infrastructure map information 410-1 indicates street information as well as subdivisions of regions such as geographical region 211-1, geographical region 212-3, geographical region 212-4, geographical region 212-5, geographical region 212-6, geographical region 213-2, geographical region 213-3, geographical region 213-4, geographical region 213-5, geographical region 213-6, geographical region 214-2, geographical region 214-3, geographical region 214-4, geographical region 214-5, geographical region 215-5, etc.

Note that although the regions associated with the network infrastructure map information 410-1 are subdivided into square partitions in this non-limiting example embodiment, each of the geographical regions can be of any suitable shape such as octagon, circle, etc.

The geographical regions can be selected to be of any suitable size. For example, in one non-limiting example embodiment, each of the geographical regions is of approximately equal size such as around 328 square feet of area (100 meters×100 meters). In most cases, a single base station (wireless access point) installed in a respective geographical region supports full wireless coverage to any mobile device users that happen to be in the geographical region or one or more adjacent or nearby regions.

As previously discussed, embodiments herein include the discovery that some of the geographical regions and corresponding physical infrastructure residing in the candidate pool of regions may or may not be good candidates to install a respective new wireless access point.

In one embodiment, in addition to subdivided regions, the network infrastructure map information 410-1 includes a map of network resources (physical infrastructure such as aerial strands, underground cables, telephone poles, etc.) that are available to facilitate installation of a respective new wireless access point. As its name suggests, the network infrastructure map information 410-1 indicates locations of the different available resources as well. Selection of locations for implementing wireless access points depends on multiple factors as further discussed herein.

In this example embodiment, assume that the wireless coverage information 410 indicates a desire to provide wireless connectivity/services to geographical regions 212-3, 212-4, 213-2, 213-3, 213-4, 214-2, 214-3, and 214-4.

Via network infrastructure map information 410-1, the configuration management resource 140 is identifies presence and locations of available physical infrastructure such as aerial strands, underground cables, telephone poles, power sources, etc., as further shown, the network infrastructure map information 410-1 can be configured to show undesirable obstacles such as buildings B1, B2, B3, B4, etc., that may affect the ability to provide wireless services in the region as specified by the wireless coverage information 410. Based on the information in the network infrastructure map information 410-1, the configuration management resource 140 analyzes available resources to determine how best to implement a respective new wireless network In this example embodiment, the network infrastructure map information 410-1 indicates that: telephone pole P1 is located at location L1; telephone pole P2 is located at location L2; telephone pole P3 is located at location L3; telephone pole P4 is located at location L4; telephone pole P5 is located at location L5; telephone pole P6 is located at location L6; telephone pole P7 is located at location L7; telephone pole P8 is located at location L8; telephone pole P9 is located at location L9; telephone pole P10 is located at location L10; and so on.

Network infrastructure map information 410-1 further illustrates that: a first aerial strand (such as above ground communication links such as coax, fiber, twisted pair of wires, etc.) extends between the telephone pole P1 and telephone pole P2; a third aerial strand (such as above ground communication links such as coax, fiber, twisted pair of wires, etc.) extends between the telephone pole P3 and telephone pole P4; a fourth aerial strand (such as above ground communication links such as coax, fiber, twisted pair of wires, etc.) extends between the telephone pole P4 and telephone pole P5; a fifth aerial strand (such as above ground communication links such as coax, fiber, twisted pair of wires, etc.) extends between the telephone pole P5 and telephone pole P6; and so on.

Note that each of the aerial strands supports conveyance of the bidirectional communication signals, power signals, etc., supporting connectivity of respective wireless access points.

Figure 6:
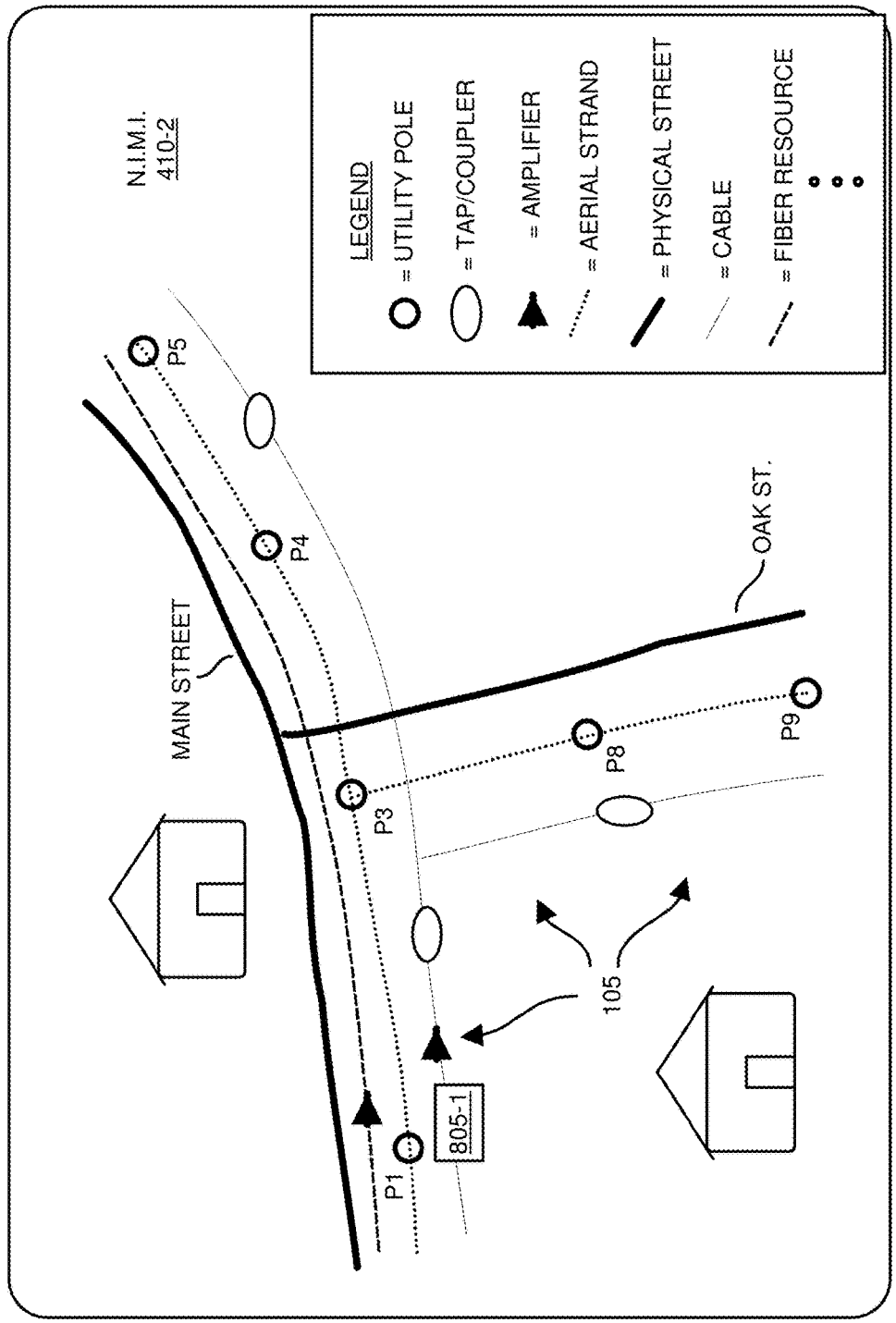
FIG. 6 is an example diagram illustrating network infrastructure mapping information according to embodiments herein.

FIG. 6 is an example diagram illustrating network infrastructure mapping information according to embodiments herein.

In this example embodiment, symbols (such as associated with physical infrastructure) displayed in the network infrastructure map information 410-2 represent corresponding objects located in the geographical region.

As shown, the network infrastructure map information 410-2 captures network environment details associated with network infrastructure such as a physical location of utility poles, aerial resources on which to potentially mount one or more base stations, amplifiers, cables, power source to power the wireless base stations, fiber resources, taps, couplers, underground resource 805-1, etc. Accordingly, via the details displayed in network infrastructure map information 410-2, the configuration management resource 140 identifies presence and/or locations of the different types of resources in a geographical region. Based on availability, the configuration management resource 140 determines where to install one or more wireless access points.

Figure 7:
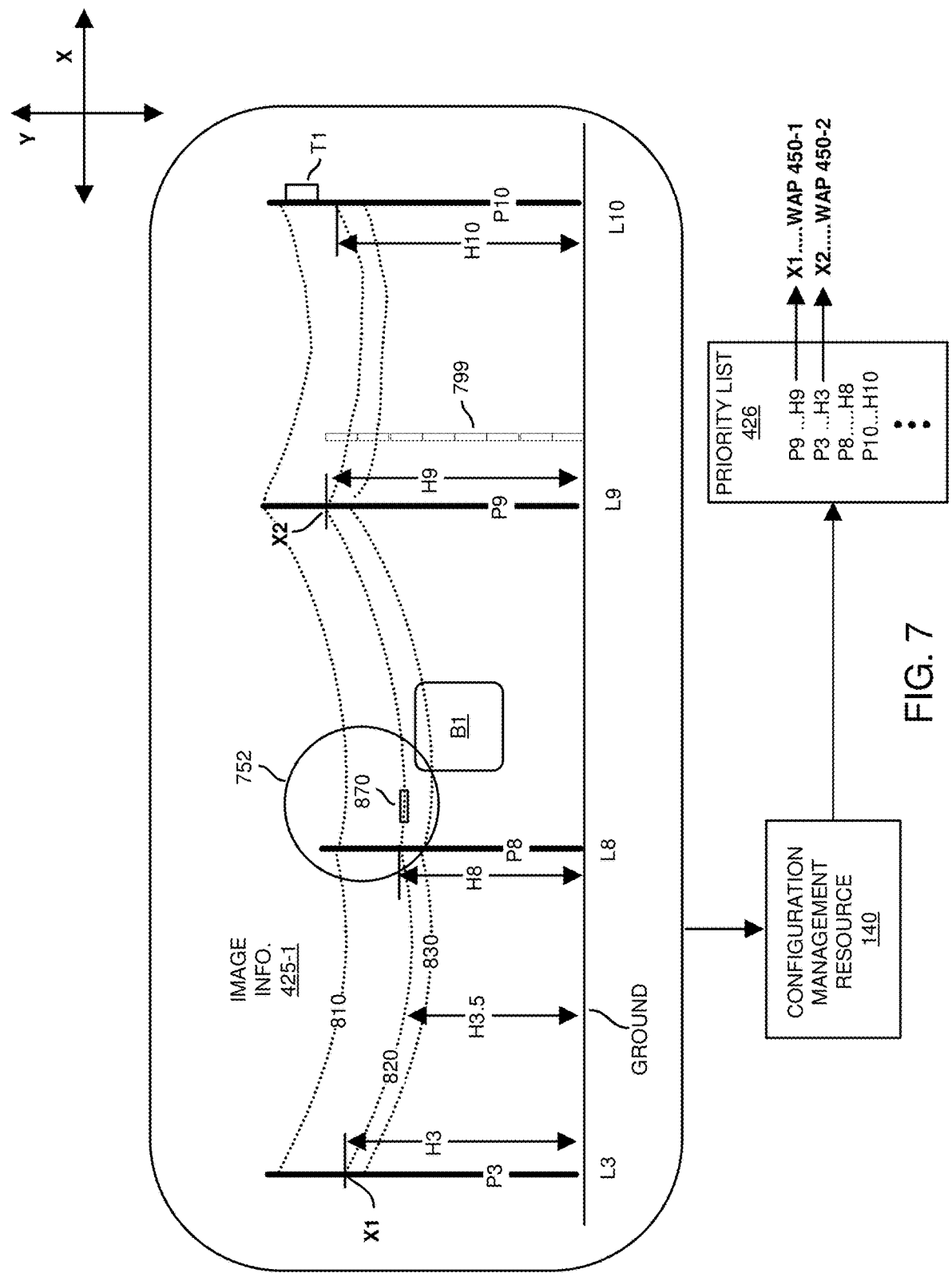
FIG. 7 is an example diagram illustrating a network environment and installation of wireless access points according to embodiments herein.

FIG. 7 is an example diagram illustrating a network environment and installation of wireless access points according to embodiments herein.

As previously discussed, the configuration management resource 140 initially uses the network infrastructure map information 410 to determine availability of different physical infrastructure in a network environment. The image information 425 provides additional information about the attributes of the available physical infrastructure.

For example, via the network infrastructure map information 410, the configuration management resource 140 determines availability of candidate poles P3, P8, P9, P10, etc., and corresponding aerial strands in which to potentially install one or more wireless base station to provide wireless coverage to the geographical region (such as selected region or area including geographical regions 212-3, 212-4, 213-2, 213-3, 213-4, 214-2, 214-3, and 214-4) as specified by the wireless coverage information 410.

In one embodiment, the network infrastructure map information 410 does not indicate height information or side view information associated with the available physical infrastructure in the selected wireless region. The height of installing a respective wireless base stations is useful to know because, typically, a wireless base station implemented at a higher height provides better wireless coverage, thus reducing overall number of wireless base stations that need to be implemented in a particular proposed wireless network to provide desired wireless coverage.

In one nonlimiting example embodiment, to determine attributes such as height information associated with the physical infrastructure as specified by the network infrastructure map information 410, the configuration management resource 140 maps locations of each of the available resources such as telephone poles P1, P2, P3, etc., to locations in the image information 425. The configuration management resource 140 maps a location of each of the one or more of the telephone poles of interest to corresponding images of those telephone poles. In this example embodiment, the configuration management resource 140 maps locations L3, L8, L9, and L10 to one or more images associated with the image information 425-1 illustrating those resources from a side view. The configuration management resource 140 can be configured to retrieve the image information 425-1 from any suitable resource such as a website, local repository, etc.

As previously discussed, the configuration management resource 140 analyzes the images in image information 425-1 to determine further attributes associated with those available physical infrastructure resources. For example, in one embodiment, the operation of analyzing images of the available physical infrastructure by the configuration management resource 140 includes determining presence or lack of undesirable objects or attributes associated with the respective physical infrastructure.

More specifically, in this example, the configuration management resource 140 analyzes the image information 425-1 in a vicinity (locations L3, L8, L9, and L10) of the poles P3, P8, P9, and P10 and determines that wireless signal interfering object 752 (such as a tree or other entity) and building B1 are both located in close proximity to the pole P8. The detected objects block conveyance of wireless signals. Presence of these blocking objects reduces the desirability of installing a respective wireless access point on the pole P8 with respect to other poles (free of objects) and aerial strands that do not have wireless signal blocking objects nearby.

Via image processing, the configuration management resource 140 further analyzes the pole P3 at location L3 and determines that there are generally no wireless signal blocking objects in the vicinity of pole P3. The configuration management resource 140 further analyzes the pole P9 at location L9 and determines that there are generally no wireless signal blocking objects in the vicinity of pole P9. The configuration management resource 140 further analyzes the pole P10 at location L10 and determines that there are no wireless signal blocking objects in the vicinity of pole P10.

In one embodiment, in response to detecting presence of no wireless signal interfering objects in the vicinity of the poles P3, P9, and P10, the communication management resource 140 initially selects these instances of physical infrastructure as fairly good candidates in which to implement a respective wireless access point. Thus, embodiments herein include the configuration management resource 140 selecting one or more instances of the physical infrastructure in which to potentially install a wireless access point associated with the proposed wireless network installation plan based on detected undesirable objects as indicated by the images.

To further determine which of the one or more candidate poles is best suited to implement a respective wireless base station, the configuration management resource 140 determines height attributes associated with each of the polls as well as whether any of the poles has a respective nearby transformer that likely would cause interference with wireless signals from a respective base station. In other words, if the respective pole includes a transformer, then that pole is a low priority pole in which to install a wireless base station.

In this example embodiment, via image processing, the configuration management resource 140 detects that transformer T1 is located on the telephone pole P10. Although the telephone pole P10 provides a good height above ground such as distance H10, presence of the transformer T1 substantially reduces the desirability of installing a respective wireless base station to implement the new wireless network.

In still further example embodiments, the configuration management resource 140 analyzes the image information 425-1 to determine corresponding height attributes of the available physical infrastructure (such as poles P3, P8, P9, and P10).

Note further that the service provider implementing the new wireless network may be limited to use of the physical infrastructure. For example, the configuration management resource 140 can be configured to analyze the different portions of image information 425-1 to determine presence of the telephone poles as well as the cables extending between them. In one embodiment, the configuration management resource 140 uses standard cable installation guidelines as an aid to determine that cable 810 is a high-voltage line not available for installation of a respective wireless access point. Additionally, via the standard guidelines, the configuration management resource 140 determines that the lowest cable 830 supports telephone equipment. The cable 820 is a network cable supporting installation of a respective one or more wireless access points.

In one embodiment, it is known via standards that the cable 820 such as implementing network communication links must be a minimum of 6 feet below any high-voltage cables 810. Such information can be used by the configuration management resource 140 as a basis to determine the type of different cables in the image information 425-1 and which of them can be used to install a respective one or more wireless access points.

For example, in this example embodiment, based on analysis of the image information 450-1, in furtherance of determining height information, the configuration management resource 140 detects presence of a known type of object 870 (such as a housing, cover, box, equipment, etc.) disposed on respective physical infrastructure. The configuration management resource 140 implementing the new wireless coverage may be aware of the type associated with the detected objected and its dimensions.

For example, via image processing and implementation of one or more object recognition applications, the configuration management resource 140 determines a respective type associated with the object 870. The type of object 870 may be one of multiple types of objects known to the configuration management resource 140. Based on the recognition of object 870, and its type, the configuration management resource 140 maps the known object 870 (such as type information T5 or other suitable value) to corresponding dimension information stored in a repository for the type T5 object 870. The configuration management resource 140 uses the dimension information as a basis in which to determine one or more heights of candidate locations in which to install respective one or more wireless access points.

More specifically, in one embodiment, assume that the dimension information indicates that the object 870 is 2.5 feet long and 4 inches in diameter. Via virtual stacking (stack 799) of multiple instances of the object 870 (where each virtual object stack 799 is a rotated copy of the original object 870) on the image information 425-1, the configuration management resource 140 determines the height associated with base station placement zones associated with each of the poles. For example, height H9 is 8×2.5 feet=20 ft; height H10 is 8×2.5 feet=20 ft; height H3 is 7×2.5 feet=17.5 ft; height H8 is 6×2.5 feet=15 ft; and so on. Thus, in one embodiment, the configuration management resource 140 maps the known type of object 870 to corresponding dimension information. Subsequently, via extrapolation or other suitable techniques, the configuration management resource determines the height attributes of the available physical infrastructure and corresponding a station placement options based on the corresponding dimension information.

In further example embodiments, based on the height information attributes, the configuration management resource 140 produces a priority listing 426 of different instances of physical infrastructure in which to potentially install wireless access points. As previously discussed, the taller poles and respective sites are generally preferred for implementing a respective wireless base station. Pole P10 and pole P8 are undesirable which to implement a respective wireless base station for the reasons as previously discussed.

In this example embodiment, even though the pole P10 has a good height, the pole P10 is place lower in the priority list 426 because it supports transformer T1. Pole P8 is less desirable because of the short height H8 in which to install a respective mouse access point. However, poles P3 and P9 are both of good height and are free from any transformers were nearby wireless signal blocking objects. In such an instance, the configuration management resource places poles P3 and P9 at the top of the priority list 426.

Based on the determined height attributes, and priority list 426, the configuration management resource 140 selects pole P9 as first physical infrastructure of the available physical infrastructure in which to install (at location X1) a first wireless access point 450-1 associated with the proposed new wireless network. The configuration management resource 140 selects pole P3 as second physical infrastructure of the available physical infrastructure in which to install (at location X2) a second wireless access point 450-2 associated with the proposed new wireless network. In this manner, the configuration management resource 140 selects any number of wireless access points in which to implement the proposed wireless network installation plan 450.

Note that the location of installing a respective wireless access point is not limited to the location X1 and X2. As previously discussed, in certain instances, it is desirable to implement installation of the wireless access point in the wireless base station on a respective aerial (cable) extending between 2 telephone poles. In such an instance, the configuration management resource 140 considers placement along any point of the aerial as well for installation of a respective wireless access point.

The configuration management resource 140 generates the proposed wireless network installation plan 450 to include specific information about the number of wireless stations to deployed as well as location and height information associated with such wireless stations. In such an instance, the proposed wireless network installation plan 450 provides guidance to a respective installer installing the wireless access points.

In further example embodiments, as previously discussed, prior to installation of the new wireless network as indicated by the proposed wireless network installation plan, the communication management resource 140 or other suitable entity performs a test simulation (such as via simulation verification resource 460 or other suitable entity) to confirm that the proposed wireless network installation plan provides a desired wireless coverage in a geographical region. In one embodiment, as previously discussed, the simulation verification of the proposed wireless network can include accounting for the different locations and heights in which the wireless access points are installed as well as nearby obstacles as determined by the image information.

Embodiments herein are useful over conventional techniques. For example, implementation of a configuration management resource and corresponding operations as discussed herein provides improved and expeditious implementation of wireless networks to provide wireless connectivity to different users.

Figure 8:
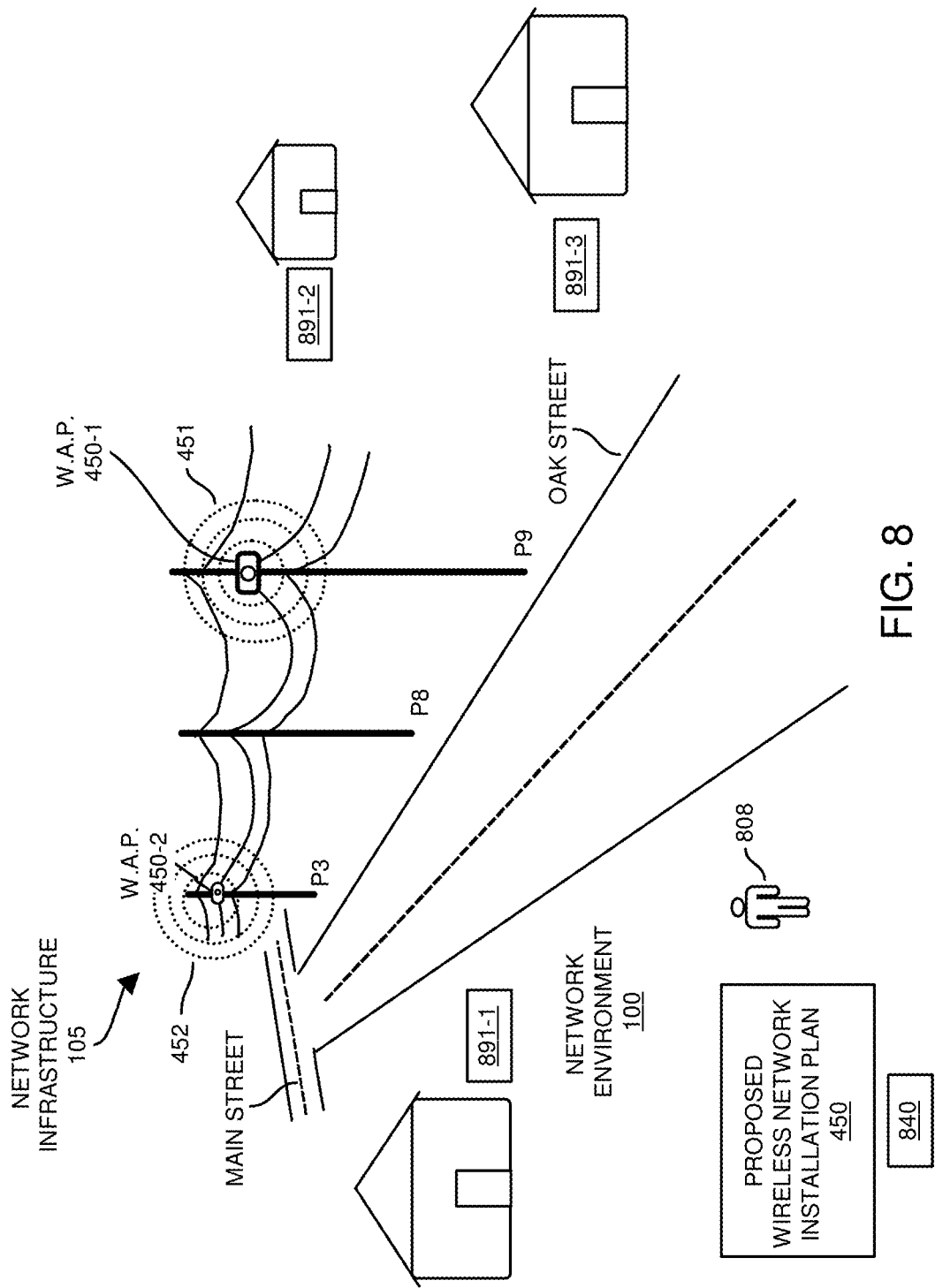
FIG. 8 is an example diagram illustrating one or more images and image processing according to embodiments herein.

FIG. 8 is an example diagram illustrating images and image processing according to embodiments herein.

Note that the proposed wireless network installation plan 450 can be configured to include any number of wireless access points (a.k.a., wireless base stations, wireless stations, customer premises equipment, etc.) to provide desired wireless coverage in a particular geographical region as specified by the wireless coverage information 410. For example, in one embodiment, assume that the proposed wireless network installation plan 450 specifies a: installation of a first wireless access point 450-1 on the telephone pole P9 at location L9; installation of a second wireless access point 450-2 on the telephone pole P3 at location L3; installation of a third wireless access point 450-3 on the telephone pole P5 at location L5; and so on. As previously discussed, the combination of wireless base stations provides wireless connectivity to the region as specified by the wireless coverage information 410.

Based on heights, locations, etc., associated with each of the wireless base station 450-1, 450-2, 450-3, etc., as determined based on the analysis, the configuration management resource 140 performs a wireless simulation of the proposed wireless network installation plan 450.

As further shown in FIG. 8, the corresponding technician 808 or other suitable entity installs the respective proposed wireless network and corresponding wireless access points 450-1, 450-2, etc., to physically implement the proposed wireless network installation plan 450. For example, the technician 808 installs the wireless access point 450-1 at the appropriate height H9 on the physical infrastructure P9; the technician 808 installs the wireless access point 450-2 at the appropriate height H3 on physical infrastructure P3; and so on.

In further example embodiments, subsequent to installation, the technician 808 or other suitable entity tests operation of the installed wireless access points associated with the proposed wireless network installation plan 450. For example, during the test, the wireless access point 450-1 transmits wireless signals 451 to one or more communication devices 891 (such as communication device 891-1, communication device 892-2, etc.) in the network environment 100; the wireless access point 450-2 transmits wireless signals 452 to one or more communication devices in the network environment 100; and so on.

Note that testing of the wireless access points can include any further one or more operations. For example, further embodiments herein can include each of the one or more communication devices receiving wireless signals 451, 452, etc., generating wireless receiver power information indicating a respective wireless power level at which the communication devices receive one or more of the wireless signals 451, 452, etc.

The one or more communication devices wirelessly communicate the wireless receive information associated with signals 451, 452, etc., (such as via feedback) through the one or more wireless access points to the communication management resource 840. Communication management resource 840 assesses the performance of the installed wireless access points based on the information associated with respective wireless access points 451, 452, etc. In one embodiment, the communication management resource 840 analyzes the received power information (feedback from communication devices) indicating a respective wireless power level at which each of the communication devices receives one or more of the wireless signals 451, 452, etc., to determine whether the installed network and corresponding wireless access points 450 provide the appropriate wireless connectivity performance (such as data rate, wireless reception of signals above a threshold level, etc.) to communication devices in the one or more geographical regions 212-3, 212-4, 213-2, 213-3, 213-4, 214-3, and 214-4 (see FIG. 5).

Figure 9:
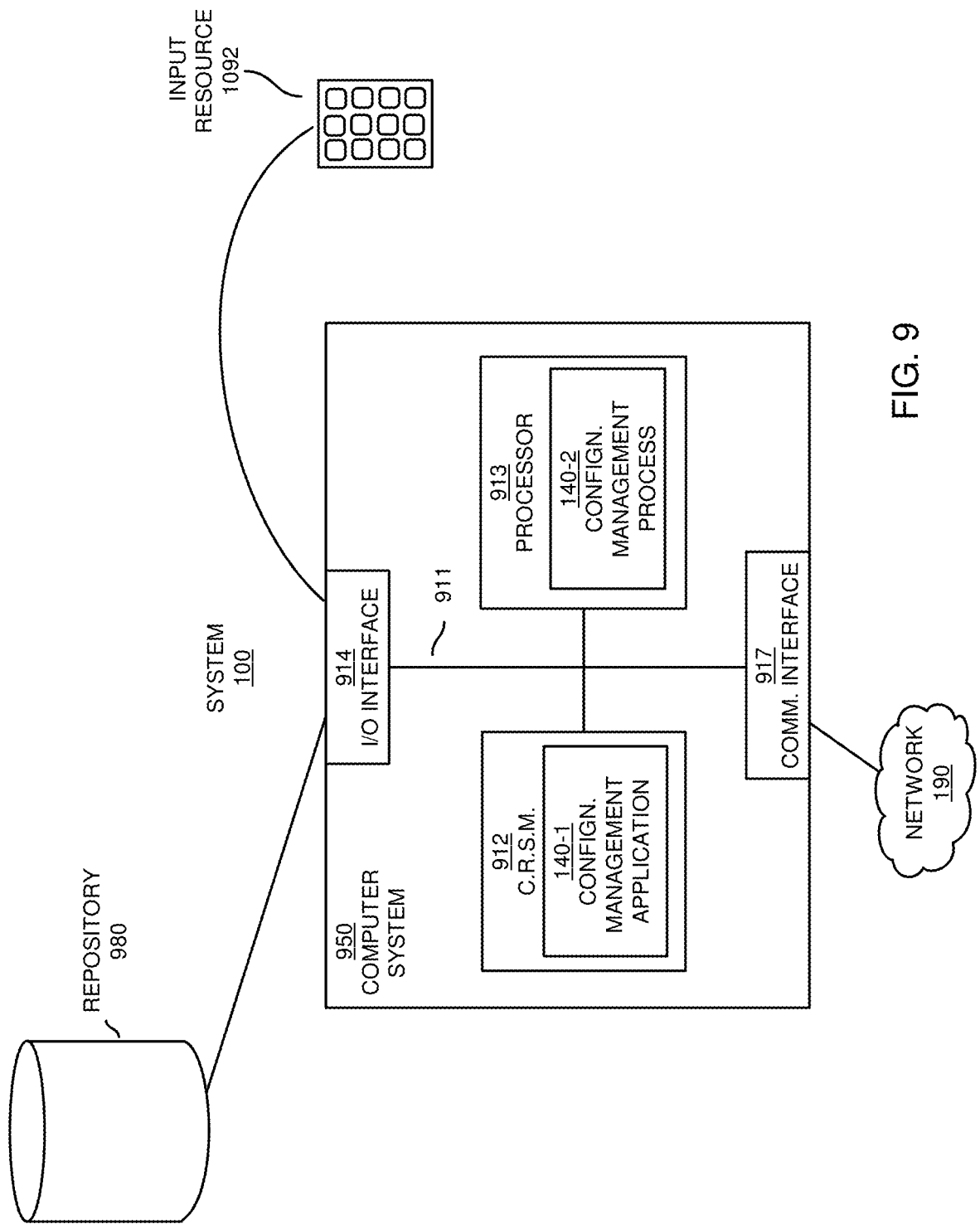
FIG. 9 is an example diagram illustrating example computer hardware and software operable to execute operations according to embodiments herein.

FIG. 9 is an example block diagram of a computer system for implementing any of the operations as previously discussed according to embodiments herein.

Note that any of the resources (such as configuration management resource 140, simulation verification resource 160, order system 480, etc.) as discussed herein can be configured to include computer processor hardware and/or corresponding executable instructions to carry out the different operations as discussed herein.

For example, as shown, computer system 950 of the present example includes interconnect 911 coupling computer readable storage media 912 such as a non-transitory type of media (which can be any suitable type of hardware storage medium in which digital information can be stored and or retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) in a respective wireless station to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
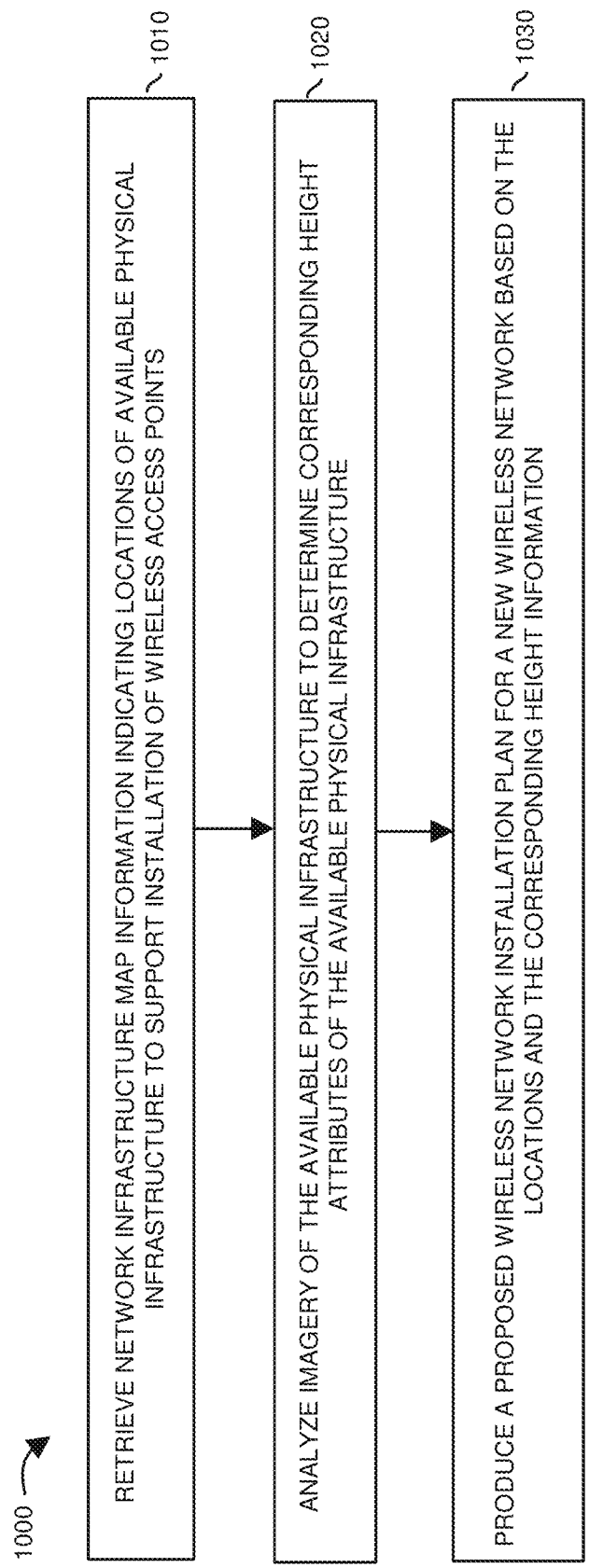
FIG. 10 is an example diagram illustrating a method according to embodiments herein.

FIG. 10 is a flowchart 1000 illustrating an example method according to embodiments herein. Note that there will be some overlap with respect to concepts as discussed above.

In processing operation 1010, the configuration management resource 140 retrieves network infrastructure map information 420 indicating locations of available physical infrastructure (such as poles, aerial wires, power sources, etc.) to support installation of wireless access points such as wireless access point 450-1, 450-2, etc.

In processing operation 1020, the configuration management resource 140 analyzes image information 425-1 of the available physical infrastructure (such as poles, aerial wires, power sources, etc.) to determine corresponding attributes (such as height or other attributes) of the available physical infrastructure.

In processing operation 1030, the configuration management resource 140 produces a proposed wireless network installation plan 450 for a new wireless network based on the locations and the corresponding attribute information (such as height, location, etc.).

Note again that techniques herein are well suited to facilitate processing of available physical infrastructure information and generation of a proposed wireless network installation plan for implementation of the new wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    retrieving network infrastructure map information indicating locations of available physical infrastructure to support installation of wireless access points, wherein the network infrastructure map information includes a top view of a geographical region indicating the locations of the available physical infrastructure;
    analyzing at least one image of the available physical infrastructure to determine corresponding attributes of the available physical infrastructure, wherein the at least one image is from a side view of the available physical infrastructure in the geographical region; and
    the method further comprising: producing a proposed wireless network installation plan for a new wireless network based on the locations and the corresponding attributes of the available physical infrastructure, the proposed wireless network installation plan produced based on a combination of the top view of the geographical region and the side view of the available physical infrastructure in the geographical region.

2. The method as in claim 1 further comprising:
receiving wireless coverage information indicating a desired wireless coverage to be provided by the new wireless network in the geographical region.

3. The method as in claim 1, wherein analyzing at least one image of the available physical infrastructure includes:
mapping the locations of the available physical infrastructure as indicated by the network infrastructure map information to respective instances of the available physical infrastructure in the at least one image; and
producing the proposed wireless network installation plan for the new wireless network based on the mapping.

4. The method as in claim 1 further comprising:
installing a first wireless access point as specified by the proposed wireless network installation plan in a network environment to deploy the new wireless network and provide a desired wireless coverage in the geographical region; and
via the first wireless access point, wirelessly communicating signals from the new wireless network to a communication device in the geographical region.

5. The method as in claim 1, wherein analyzing at least one image of the available physical infrastructure includes:
detecting presence of a wireless signal interfering object in a vicinity of first available physical infrastructure; and
detecting presence of no wireless signal interfering object in a vicinity of second available physical infrastructure.

6. The method as in claim 5 wherein producing the proposed wireless network installation plan includes:
in response to detecting presence of no wireless signal interfering object in the vicinity of the second available physical infrastructure, selecting the second available physical infrastructure as a candidate for installation of a respective wireless access point associated with the proposed wireless network installation plan.

7. The method as in claim 1, wherein the proposed wireless network installation plan includes proposed implementation of a first wireless access point at a first location and at a first height as determined from the corresponding attributes, the method further comprising:
performing a wireless simulation of the proposed wireless network installation plan based on the proposed implementation of the first wireless access point at the first location and at the first height.

8. The method as in claim 1 further comprising:
based on the determined corresponding attributes, producing a priority listing of different instances of candidate physical infrastructure in which to install wireless access points associated with the proposed wireless network installation plan.

9. The method as in claim 1, wherein producing the proposed wireless network installation plan includes:
selecting an instance of the available physical infrastructure in which to install a wireless access point associated with the proposed wireless network installation plan based on height attributes of the available physical infrastructure as determined from the at least one image.

10. The method as in claim 1, wherein analyzing at least one image of the available physical infrastructure to determine corresponding attributes of the available physical infrastructure includes:
determining height attributes of the available physical infrastructure based on corresponding dimension information associated with an object in the at least one image.

11. The method as in claim 1, wherein the corresponding attributes indicate heights of the available physical infrastructure.

12. The method as in claim 11, wherein producing the proposed wireless network installation plan includes:
via the proposed wireless network installation plan, proposing installation of a first wireless access point in the new wireless network based on a combination of: i) the heights of the available physical infrastructure as determined from the at least one image, and ii) the locations of the available physical infrastructure as indicated by the network infrastructure map information.

13. The method as in claim 1 further comprising:
producing the proposed wireless network installation plan to indicate installation of a first wireless access point in the geographical region based on: i) the locations of the available physical infrastructure as indicated by the network infrastructure map information, and ii) the corresponding attributes of the available physical infrastructure as determined from the at least one image.

14. The method as in claim 1, wherein the available physical infrastructure includes first physical infrastructure and second physical infrastructure; and
wherein analyzing the at least one image of the available physical infrastructure includes: mapping a first location of the first physical infrastructure as indicated by the network infrastructure map information to a first image of the first physical infrastructure in the at least one image; and mapping a second location of the second physical infrastructure as indicated by the network infrastructure map information to a second image of the second physical infrastructure in the at least one image.

15. A method comprising:
retrieving network infrastructure map information indicating locations of available physical infrastructure to support installation of wireless access points;
analyzing at least one image of the available physical infrastructure to determine corresponding attributes of the available physical infrastructure;
producing a proposed wireless network installation plan for a new wireless network based on the locations and the corresponding attributes of the available physical infrastructure; and
wherein producing the proposed wireless network installation plan includes: selecting an instance of the physical infrastructure in which to install a wireless access point associated with the proposed wireless network installation plan based on detected undesirable objects as indicated by the at least one image.

16. A method comprising:
retrieving network infrastructure map information indicating locations of available physical infrastructure to support installation of wireless access points;
analyzing at least one image of the available physical infrastructure to determine corresponding attributes of the available physical infrastructure;
producing a proposed wireless network installation plan for a new wireless network based on the locations and the corresponding attributes of the available physical infrastructure; and
wherein analyzing at least one image of the available physical infrastructure to determine corresponding attributes of the available physical infrastructure includes:
detecting presence of a known type of object in the at least one image;

mapping the known type of object to corresponding dimension information; and determining height attributes of the available physical infrastructure based on the corresponding dimension information.

17. The method as in claim 16 further comprising:

based on the determined corresponding attributes, selecting first physical infrastructure of the available physical infrastructure in which to install a first wireless access point associated with the proposed new wireless network; and producing the proposed wireless network installation plan to include implementation of the first wireless access point at a first height with respect to the first physical infrastructure.

18. A method comprising:

retrieving network infrastructure map information indicating locations of available physical infrastructure to support installation of wireless access points;

analyzing at least one image of the available physical infrastructure to determine corresponding attributes of the available physical infrastructure;

producing a proposed wireless network installation plan for a new wireless network based on the locations and the corresponding attributes of the available physical infrastructure; and prior to installation of the new wireless network, performing a test simulation to confirm that the proposed wireless network installation plan provides a desired wireless coverage in a geographical region.

19. A method comprising:

retrieving network infrastructure map information indicating locations of available physical infrastructure to support installation of wireless access points;

analyzing at least one image of the available physical infrastructure to determine corresponding attributes of the available physical infrastructure;

producing a proposed wireless network installation plan for a new wireless network based on the locations and the corresponding attributes of the available physical infrastructure; and wherein producing the proposed wireless network installation plan includes: i) determining a geographical region in which to install the new wireless network; ii) mapping the geographical region to channel information indicating available channels to support the new wireless network; and iii) producing the proposed wireless network installation plan based at least in part on the channel information.

20. A system comprising:

configuration management hardware operative to:

retrieve network infrastructure map information indicating locations of available physical infrastructure to support installation of wireless access points;

receive at least one image of the available physical infrastructure;

analyze the at least one image of the available physical infrastructure to determine corresponding attributes of the available physical infrastructure; and produce a proposed wireless network installation plan for a new wireless network based on the locations and the corresponding attributes of the available physical infrastructure;

wherein, to analyze the at least one image, the configuration management hardware is further operative to: i) detect presence of a known type of object in the at least one image; ii) map the known type of object to corresponding dimension information; and iii) determine height attributes of the available physical infrastructure based on the corresponding dimension information.

21. The system as in claim 20, wherein the configuration management hardware is further operative to:

receive wireless coverage information indicating a desired wireless coverage to be provided by the new wireless network in a geographical region.

22. The system as in claim 20, wherein the configuration management hardware is further operable to:

map the locations of the available physical infrastructure as indicated by the network infrastructure map information to respective instances of the available physical infrastructure in the at least one image.

23. The system as in claim 20, wherein the configuration management hardware is further operable to:

in accordance with the proposed wireless network installation plan, initiate installation of one or more wireless access points in a network environment to deploy the wireless network and provide a desired wireless coverage in a geographical region.

24. The system as in claim 20, wherein the configuration management hardware is further operable to:

detect presence of a wireless signal interfering object in a vicinity of first available physical infrastructure; and detect presence of no wireless signal interfering object in a vicinity of second available physical infrastructure.

25. The system as in claim 24, wherein the configuration management hardware is further operable to:

in response to detecting presence of no wireless signal interfering object in the vicinity of the second available physical infrastructure, select the second available physical infrastructure as a candidate for installation of a respective wireless access point associated with the proposed wireless network installation plan.

26. The system as in claim 20, wherein the configuration management hardware is further operable to:

select an instance of the physical infrastructure in which to install a wireless access point associated with the proposed wireless network installation plan based on detected undesirable objects as indicated by the at least one image.

27. The system as in claim 20, wherein the configuration management hardware is further operable to:

based on the determined height attributes, select first physical infrastructure of the available physical infrastructure in which to install a first wireless access point associated with the proposed new wireless network; and produce the proposed wireless network installation plan to include implementation of the first wireless access point at a first height with respect to the first physical infrastructure.

28. The system as in claim 27, wherein the configuration management hardware is further operable to:

prior to installation of the new wireless network, perform a test simulation to confirm that the proposed wireless network installation plan provides a desired wireless coverage in a geographical region.

29. The system as in claim 20, wherein the configuration management hardware is further operable to:

determine a geographical region in which to install the new wireless network;

map the geographical region to channel information indicating available channels to support the new wireless network; and produce the proposed wireless network installation plan based at least in part on the channel information.

30. The system as in claim 20, wherein the proposed wireless network installation plan includes proposed implementation of a first wireless access point at a first location and at a first height determined from the corresponding attributes; and
  wherein the configuration management hardware is further operable to: perform a wireless simulation of the proposed wireless network installation plan based on the proposed implementation of the first wireless access point at the first location and at the first height.

31. The system as in claim 20, wherein the configuration management hardware is further operable to:
  based on the corresponding attributes, produce a priority listing of different instances of physical infrastructure in which to install wireless access points.

32. A method comprising:
  retrieving network infrastructure map information indicating locations of available physical infrastructure to support installation of wireless access points;
  analyzing at least one image of the available physical infrastructure to determine corresponding attributes of the available physical infrastructure, wherein analyzing at least one image of the available physical infrastructure includes: detecting presence of an object in a vicinity of a first physical resource of the available physical infrastructure, the object operative to block wireless signals; and
  producing a proposed wireless network installation plan for a new wireless network based on the locations and the corresponding attributes of the available physical infrastructure.

33. The method as in claim 32, wherein the object is not indicated by the network infrastructure map information as being present in the vicinity of the first physical resource.

34. The method as in claim 32, wherein producing the proposed wireless network installation plan includes:
  in response to detecting the presence of the object in the vicinity of the first physical resource, selecting a second physical resource for installation of a first wireless access point associated with the proposed wireless network installation plan, the wireless network installation plan indicating a proposed height in which to install the first wireless access point.

35. A method comprising:
  retrieving network infrastructure map information indicating locations of available physical infrastructure to support installation of wireless access points, wherein the network infrastructure map information indicates a top view of a geographical region including the available physical infrastructure;
  analyzing at least one image of the available physical infrastructure to determine corresponding attributes of the available physical infrastructure, wherein the at least one image is from a side view of the available physical infrastructure in the geographical region; and
  producing a proposed wireless network installation plan for a new wireless network based on the locations and the corresponding attributes of the available physical infrastructure, the proposed wireless network installation plan produced to indicate installation of a first wireless access point in the geographical region based on: i) the locations of the available physical infrastructure as indicated by the network infrastructure map information, and ii) the corresponding attributes of the available physical infrastructure as determined from the at least one image.

\* \* \* \* \*